R. E. NAUMBURG.
MECHANICAL MOVEMENT.
APPLICATION FILED SEPT. 12, 1914.
1,154,198.
Patented Sept. 21, 1915.
3 SHEETS—SHEET 3.
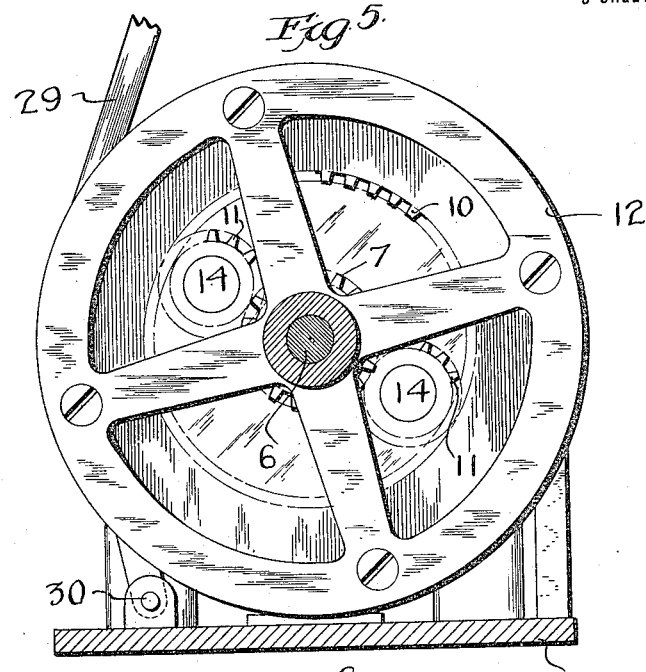
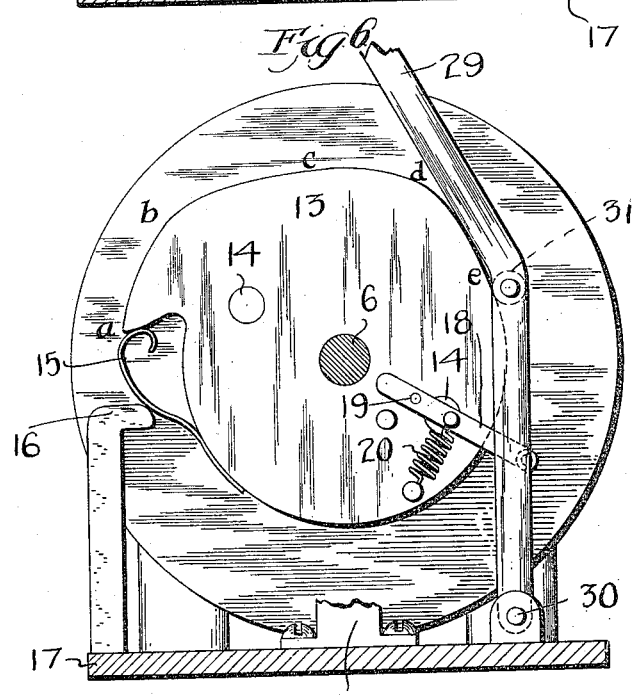
WITNESSES
INVENTOR
ATTORNEY

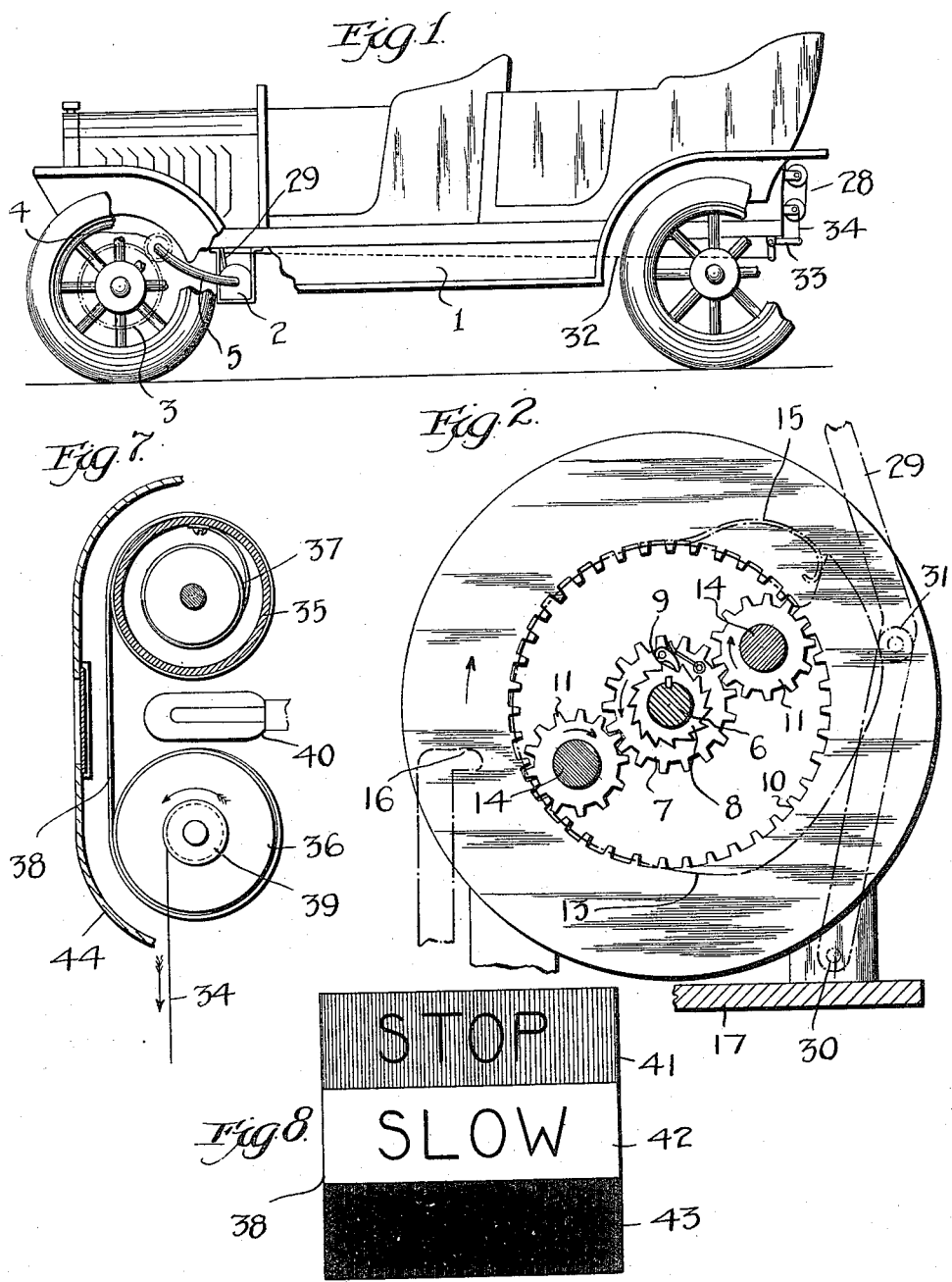

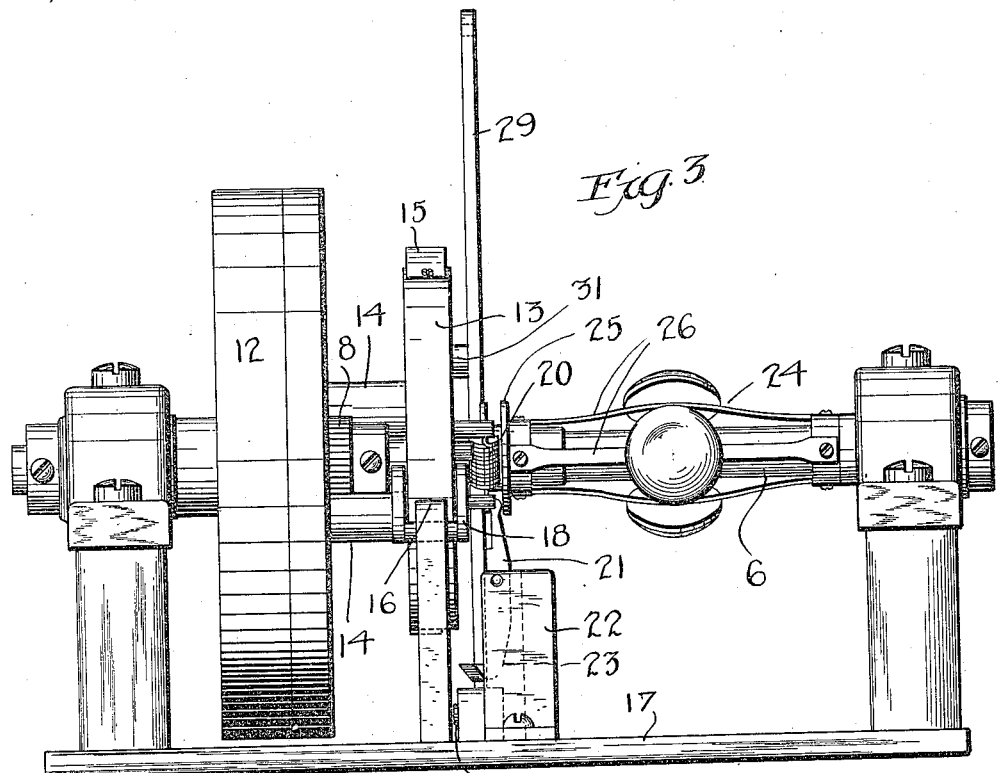
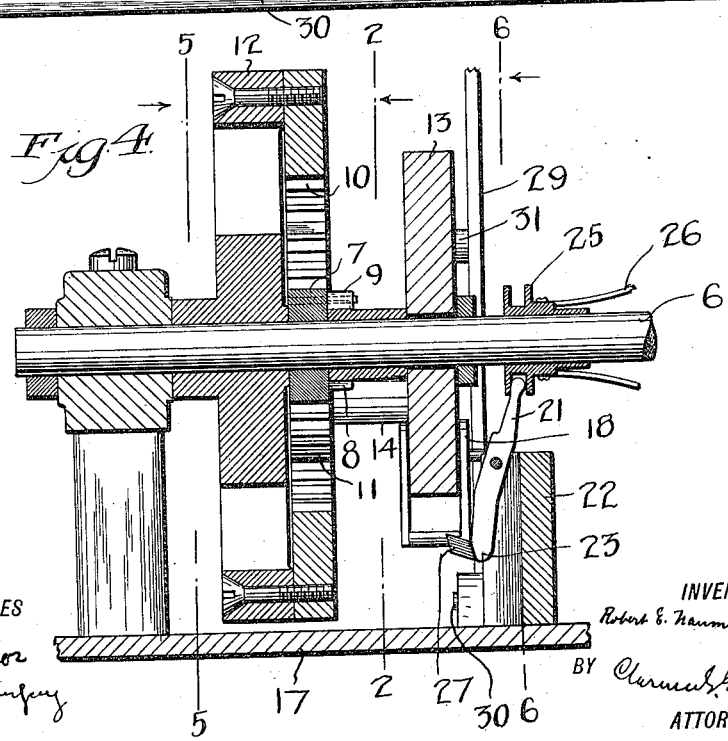

UNITED STATES PATENT OFFICE.

ROBERT E. NAUMBURG, OF NEW YORK, N. Y.

MECHANICAL MOVEMENT.

1,154,198.     Specification of Letters Patent.     Patented Sept. 21, 1915.

Application filed September 12, 1914. Serial No. 861,443.

*To all whom it may concern:*

Be it known that I, ROBERT E. NAUMBURG, a citizen of the United States, and a resident of the borough of Manhattan, in the city, county, and State of New York, have invented certain new and useful Improvements in Mechanical Movements, of which the following is a specification.

My invention comprises a novel mechanical movement capable of utilization in various connections and for various purposes, and more especially where it is desirable or required to bring about the operation of a device upon or in accordance with changes of speed in machinery, and is based upon the effect of a flywheel connected or incorporated with the driven gear of a species of differential gearing in conjunction with stops to limit the revolution of the idle gear or gears, causing these gears to revolve about the axis of the driving and driven gears immediately upon changes in speed. One application of this movement, specifically included herein, constitutes a novel signal-operating means, designed more particularly for use on automobiles, to warn vehicles behind when the machine bearing the signal commences to slow down or stop.

Various features of the invention will become apparent as the specification proceeds.

In the accompanying drawings illustrating the invention: Figure 1 is a side elevation of an automobile equipped with the signal and operating means; Fig. 2 is a section on the line 2—2 of Fig. 4, showing the cam and coöperative lever in dotted lines; Fig. 3 is a front view of the controlling mechanism; Fig. 4 is a vertical longitudinal section through part of Fig. 3; Fig. 5 is a section on the line 5—5 of Fig. 4; Fig. 6 is a section on the line 6—6 of Fig. 4; Fig. 7 is a side sectional view of the signal proper which I prefer to employ; and Fig. 8 is a face view of the signal sheet.

For convenience the invention will be described in its application as a rear signal for automobiles.

The vehicle is designated generally by the numeral 1, and the controlling mechanism 2. The latter may be driven from one of the front wheels by a gear 3, pinion 4 and flexible shaft 5, in the manner of the ordinary speedometer drive.

The details of the mechanism designated generally 2 may be widely varied. Its gears may be spur gears as shown, or bevel gears. The shaft 6 is suitably connected with the flexible shaft 5 and in turn drives the driving gear 7 of the differential gearing. The said gear is preferably loose on the shaft and is driven through a one-way acting or overrunning connection, for purposes which will be presently specified, the said connection comprising a ratchet wheel 8 fixed on the shaft and a spring-pressed pawl 9 on the gear, or a suitable equivalent thereof. In the particular construction illustrated the driven gear 10 is annular, with internal teeth; and idle spur gears 11, of which there need not necessarily be more than one, are interposed between the central gear and the annular gear to revolve therebetween about the common axis. In this connection it may be observed that in referring hereinafter to the driving and driven gears as coaxial I do not intend to limit myself to an arrangement of these gears in the same plane.

In accordance with the invention, a flywheel, or a sufficient mass of metal to give a flywheel effect, is incorporated with the driven gear or in any suitable manner connected therewith, to the end that the driven gear may lag behind the driving gear as to changes in speed produced by corresponding speed variations in the primary driving mechanism, in this case the running gear of the vehicle. In the particular construction shown a flywheel 12 is screwed to the face of the annular gear 10, and, being mounted to turn on the shaft 6, affords a rotary support for the same.

The idle gears 11 are preferably mounted on a suitable rotary carrier, which is advantageously in the nature of a cam 13, serving to produce the desired actuation of the signal or device to be controlled. In the form of construction illustrated, the said cam is rotatably mounted on the shaft 6 at a distance from the gears, the driving gear 7 with its pawl and ratchet being between the cam and the flywheel, and the shafts 14 of the idle gears projecting accordingly from the cam carrier, though manifestly these details may be varied. In the present instance the working portion of the cam comprises three levels or circular arcs of different radii, the highest being from *a* to *b*, the middle from *c* to *d*, and the lowest from *e* onward. From *b* to *c* and *d* to *e* are grades or slopes connecting the dwell portions. Manifestly the cam need not also constitute the support for the idle gears, since it could be suitably connected to such a support; and while a rotary cam is the preferred instrumentality for enabling the idle gear or gears to operate the signal or other controlled device by virtue of their movements about the axis of the driving and driven gears, I wish it to be understood that I do not necessarily limit myself to a cam.

Another important feature of the invention, the specific embodiment of which may be widely varied, comprises means for limiting revolution of the idle gears. In the preferred embodiment of the invention, the said means comprise a forward limit stop, a rear limit stop, and an intermediate temporary stop. The forward stop limits the revolution of the idle gears with the driving gear and permits them to be revolved backward by the flywheel-controlled driven gear when the speed of the latter exceeds that of the driver. Conversely, the rear stop limits such backward revolution of the idle gears, while permitting them to be carried forward again by the driving gear when the speed of the latter exceeds the speed of the driven gear. As illustrated, the forward stop is formed by the coöperation of a spring 15 carried by the cam and the top of a post 16 rising from the supporting base 17, the stop being accordingly cushioned. The rear stop is constituted by the coöperation of the underside of the overhanging top portion of the post 16 and a stirrup 18, which is pivoted at 19 to the cam. A spring 20, secured at its opposite ends to this stirrup and the cam, serves to cushion this stop also. The intermediate stop comprises a lever 21, fulcrumed intermediate its ends on a stationary part 22 and having a suitable detent portion 23 adapted to be projected into the path of the stirrup 18. This stop is controlled by a governor of suitable or approved form, such as illustrated at 24, in order that its operation may be made to depend upon the speed of a desired part of the mechanism. While this principle of a speed-controlled stop for limiting revolution of the idle gear in one direction may be utilized in various, specific, different ways, its preferred application is that illustrated in the drawings, wherein the stop is controlled by the speed of the driving mechanism, in this instance the running gear of the vehicle, and until this speed falls below a predetermined minimum is maintained in blocking relation to the backward movement of the idle gear or gears 11. To this end the governor 24 is preferably mounted on the shaft 6, and is therefore affected in accordance with the speed of the vehicle and the driving gear 7 of the differential gearing. As will be clear from Fig. 4, the upper end of the stop 21 is engaged by the longitudinally-movable, grooved collar 25 of the governor, so that the outward movement of the governor weights under centrifugal action projects the detent end of the stop into the path of the stirrup 18, while when the speed of the driver falls below the predetermined minimum, the governor springs 26 retract the said end, in order to permit the idle gears and their cam to make the complete backward movement under the action of the driven gear 10. The rear side of the detent portion of this stop is beveled, as shown at 27, in order to permit the stirrup 18 to latch past the stop on the forward movement of the cam and idle gears, while the forward abutment face of the stop arrests backward movement in the manner described.

The signal at the back of the vehicle is designated generally by the numeral 28, and is controlled by the cam or its equivalent through suitable connections. These connections, as illustrated, comprise a lever 29, fulcrumed at its lower end on a pivot 30 and having a roller 31 bearing against the periphery of the cam, together with a rearwardly extending wire 32 connecting the upper end of this lever with a bell-crank 33, and another wire 34 connecting the latter with the signal. The form of the signal may be widely varied. The one which is preferred, comprises two rollers 35 and 36, the former having a winding spring 37, after the manner of a shade roller, and a sheet or apron 38 adapted to be wound from one roller onto the other, and vice-versa. The wire 34 is secured to a drum 39 on the lower roller 36, the arrangement being such that downward pull on the wire winds the sheet 38 on the lower roller against the tension of the spring 37, which spring moves the sheet in the reverse direction when the pull on the wire is relieved. The sheet is preferably of transparent or translucent material, so as to be illuminated by transmitted light from a lamp 40, and is divided into a suitable number of panels 41, 42, 43, of different colors or designations, which are adapted to be brought one at a time behind an opening in a casing 44. The panel 41 may be of one color and bear the word "Stop", the panel 42 of another color, with the word "Slow", and the panel 43 may be black or opaque. This panel is opposite the opening when the vehicle is running at uniform speed. "Slow" appears when the vehicle commences to slacken speed, and "Stop" is shown when there is a sudden decrease in the speed, preparatory to stopping. These three conditions of the signal or indicator correspond to the three levels of the cam.

In operation, when the machine is set in motion, the driving gear 7 causes the idlers 11 to roll around on the annular driven gear 10, thus rotating the cam 13 until the spring 15 thereof brings these parts to a cushioned stop against the stationary member 16. This is the condition shown in Fig. 6, and is preserved as long as the vehicle runs at uniform speed and during increases in speed; the idle gears 11 are rotated in place by the driving gear, and in turn drive the annular gear 10 in the reverse direction to the driving gear. When the speed of the vehicle or driving mechanism slackens, the driven gear, owing to its flywheel, overruns the driving gear and carries the idlers 11 backward toward the position shown in Fig. 2. If the decrease in speed is merely a slowing down, the intermediate stop 21 is maintained in the path of the stirrup 18, and thereby arrests the backward movement of the idlers and cam. This condition is represented in Fig. 4, and at this time the roller 31 bears upon the intermediate level $c, d$ of the cam, and the lever 29, through the connections 32, 33, 34, operates the signal against the tension of the spring 37, so as to bring the "Slow" panel 42 opposite the window of the casing. If the vehicle continues to run at such lower speed, the expenditure of energy by the flywheel causes the speed of the driven gear 10 to decrease, with the result that the driving gear again assumes control of the idlers and returns the same and the cam to the position represented by Fig. 6. This brings the lowest level of the cam below the roller 31, paying out the connections 32 and 34, and permitting the spring 37 of the signal to bring the running panel 43 between the lamp and the window. If the decrease in speed is not only relative, but actually brings the vehicle to a standstill, the governor 24 no longer holds the stop 21 in obstructing relation to the cam, and the latter, with the idle gears, are accordingly free to be turned backward through the inertia of the driven gear 10 to the limiting position represented in dotted lines in Fig. 2. This movement brings the roller 31 upon the highest level $a, b$ of the cam, with the result that the signal is operated to display the stop indication. When the cam and idlers are in any one of the three positions, corresponding to the running, slow and stop conditions of the signal, the spring 37 of the latter has no effect upon the cam, because the roller 31 then bears upon a circular portion of the cam periphery. In certain instances, the stop 21 may be brought into the path of the stirrup 18 before the latter has passed this stop in moving from the position of Fig. 2 to that of Fig. 6. In such event, the beveling of the stop at 27 permits the idle gears and the cam to execute their forward movement without interference from the stop. The one-way acting connection 8, 9 between the drive shafts 6 and the driving gears 7 avoids shock to the mechanism when, in stopping, the flywheel-controlled driven gear turns the cam and idlers backward until brought to rest, as indicated in Fig. 2, since the gears 7, 11 and 10 instead of being locked at this time are free to rotate about their axes, the gear 10 continuing to rotate until its energy is expended and driving the gear 7 through the idlers 11 at a speed greater than that of the shaft 6. The one-way acting connection also permits the vehicle to run backward without operating the signal. At such time the "Stop" sign is displayed, because the vehicle must be brought to rest before it can be reversed.

From the foregoing it will be understood that my signal is operated by changes in speed, and that the indication afforded is independent of the actual speed. It is thus essentially distinguished from anything in the nature of a speedometer, the purpose of which is to indicate at any time the rate at which the vehicle is traveling.

What I claim as new is:

1. In a mechanical movement, the combination of coaxial driving and driven gears, an intermediate idle gear revoluble about said axis, means for limiting the revolution of the idle gear, and a flywheel connected with the driven gear.

2. In a mechanical movement, the combination of coaxial driving and driven gears, an intermediate idle gear revoluble about said axis, a flywheel connected with the driven gear, and means for limiting the forward revolution of the idle gear.

3. In a mechanical movement, the combination of coaxial driving and driven gears, an intermediate idle gear revoluble about said axis, a flywheel connected with the driven gear, and a cushioned stop for limiting revolution of the idle gear.

4. In a mechanical movement, the combination of coaxial driving and driven gears, an intermediate idle gear revoluble about said axis, a flywheel connected with the driven gear, means for limiting the revolution of the idle gear in each direction, and suitable means controllable by the revolution of the idle gear.

5. In a mechanical movement, the combination of coaxial driving and driven gears, an intermediate idle gear revoluble about said axis, a flywheel connected with the driven gear, a stop arranged to hold said idle gear against forward revolution and permitting the same to revolve backward with the driven gear when the speed of the latter exceeds the speed of the driving gear, and suitable means controllable by the revolution of the idle gear.

6. In a mechanical movement, the combination of coaxial driving and driven gears, an intermediate idle gear revoluble about said axis, a flywheel connected with the driven gear, stop means for limiting the revolution of the idle gear, and means operative by revolutionary movement thereof.

7. In a mechanical movement, the combination of coaxial driving and driven gears, an intermediate idle gear revoluble about said axis, a flywheel connected with the driven gear, stop means for limiting the revolution of the idle gear, and motion-transmitting means affected by the revolutionary movement thereof.

8. In a mechanical movement, the combination of coaxial driving and driven gears, an intermediate idle gear revoluble about said axis, a flywheel connected with the driven gear, a cam connected with the idle gear, means for limiting the movement of the cam and idle gear, and suitable mechanism controllable by the cam.

9. In a mechanical movement, the combination of coaxial driving and driven gears, an intermediate idle gear revoluble about said axis, a flywheel connected with the driven gear, and a governor-controlled stop for the idle gear.

10. In a mechanical movement, the combination of coaxial driving and driven gears, an intermediate idle gear revoluble about said axis, a flywheel connected with the driven gear, a stop for limiting forward revolution of the idle gear with the driving gear, a governor connected with the driving gear, a stop controlled by the governor for temporarily restraining backward revolution of the idle gear with the driven gear when the speed of the driving gear decreases, and suitable mechanism controllable by the revolutionary movement of the idle gear.

11. In a mechanical movement, the combination of coaxial driving and driven gears, an intermediate idle gear revoluble about said axis, a flywheel connected with the driven gear, fixed limits for the idle gear as to revolution in opposite directions, and an intermediate governor-controlled stop.

12. In a mechanical movement, the combination of coaxial driving and driven gears, an intermediate idle gear revoluble about said axis, a flywheel connected with the driven gear, and means operative as a stop as to revolution of the idle gear in one direction and permitting the same to latch by in the opposite direction.

13. In a mechanical movement, the combination of coaxial driving and driven gears, an intermediate idle gear revoluble about said axis, a flywheel connected with the driven gear, a fixed stop for the idle gear, and a governor-controlled stop for temporarily arresting revolution of the idle gear in one direction and permitting the same to latch by in the opposite direction.

14. In a mechanical movement, the combination of a driving element, a driving gear, a one-way acting connection therebetween, a driven gear, a flywheel connected therewith, an idle gear revoluble about the axis of the driving and driven gears, and means for limiting the revolution of the idle gear.

In testimony whereof I have signed my name in the presence of two subscribing witnesses.

ROBERT E. NAUMBURG.

Witnesses:
GRACE H. EMPEY,
SARAH J. GIBSON.

Copies of this patent may be obtained for five cents each, by addressing the "Commissioner of Patents, Washington, D. C."